United States Patent [19]
Palovcik

[11] 4,417,462
[45] Nov. 29, 1983

[54] AXLE SPINDLE AND METHOD FOR MAKING THE SAME

[75] Inventor: John Palovcik, Kenton, Ohio

[73] Assignee: Rockwell International Corporation, Pittsburgh, Pa.

[21] Appl. No.: 327,313

[22] Filed: Dec. 4, 1981

Related U.S. Application Data

[60] Continuation of Ser. No. 182,283, Aug. 28, 1980, abandoned, which is a division of Ser. No. 62,713, Aug. 1, 1979, abandoned.

[51] Int. Cl.³ .................. B21D 41/00; B21D 51/10; B60B 35/00
[52] U.S. Cl. .................. 72/367; 72/340; 72/402; 301/124 R; 301/131
[58] Field of Search .......... 72/367, 368, 377, 402, 72/340, 356; 301/124 R, 126, 130, 131, 132, 134, 135, 109, 1; 308/211, 214, 64, 16, 218; 74/607

[56] References Cited
U.S. PATENT DOCUMENTS

| | | | |
|---|---|---|---|
| Re. 15,058 | 3/1921 | Heina | 308/16 |
| 1,405,642 | 2/1922 | Vanderbeek | 301/126 |
| 1,964,258 | 6/1934 | Graham | 72/367 |
| 2,124,406 | 7/1938 | Spatta | 301/124 R |
| 2,133,091 | 10/1938 | Gettig | 301/124 R |
| 2,165,472 | 7/1939 | Friedman | 301/124 R |
| 2,625,055 | 1/1953 | Cudy | 301/124 R |
| 3,273,916 | 9/1966 | Tillery | 72/367 |
| 3,292,414 | 12/1966 | Goeke | 72/367 |
| 3,668,918 | 6/1972 | Benteler et al. | 72/367 |
| 3,841,130 | 10/1974 | Scott et al. | 72/367 |
| 3,892,117 | 7/1975 | Nelson | 72/367 |

FOREIGN PATENT DOCUMENTS

| | | | |
|---|---|---|---|
| 969723 | 12/1950 | France | 301/132 |
| 27136 | of 1912 | United Kingdom | 301/132 |

*Primary Examiner*—Lowell A. Larson

[57] ABSTRACT

A spindle for an axle is capable of supporting a vehicle wheel which is rotatably mounted thereon at a pair of axially disposed bearings. The spindle includes a cylindrical portion at its outer end which serves as an outer bearing mounting region while the portion of the spindle inwardly of the outer bearing mounting region is provided a frusto-conical outer surface. The inner wheel bearing has an inner race with a frusto-conical inner surface so that the frusto-conical outer surface of the spindle will serve as the inner bearing mounting region. Such a spindle is preferably cold formed from a hollow tubular blank having a generally uniform external diameter and wall thickness.

3 Claims, 5 Drawing Figures

AXLE SPINDLE AND METHOD FOR MAKING THE SAME

This is a continuation, of application Ser. No. 182,283, filed Aug. 28, 1980, and now abandoned which is a divisional of application Ser. No. 62,713, filed Aug. 1, 1979 and now abandoned.

BACKGROUND OF THE INVENTION

1. Field of the Invention

This invention relates to a spindle for an axle and, more particularly, to a method for making a spindle having a pair of axially disposed bearing regions with a frusto-conical portion serving as the inner bearing region.

2. Description of the Prior Art

There remains a continuing need for reliable, safe and lightweight axles and/or axle spindles for heavy duty trucks and trailers. An axle of this general type is disclosed in U.S. Pat. No. 3,037,818 to include at each spindle an outer first bearing and an inner second bearing for supporting the wheels. One area of concern when providing axles and axle spindles for these heavy duty vehicles is that adequate support and strength will be provided in the area of the wheel bearings. Consequently, the inner wheel bearing region has generally included an integral, radially extending bearing stop adjacent thereto and the spindle is generally thickened in this region to provide the desired strength. The bearing stop establishes the location of the wheel relative to the end of the spindle with a retaining nut being used to secure the wheel on the spindle as the inner bearing is forced against the bearing stop. While U.S. Pat. No. 3,037,818 discloses one axle and spindle, U.S. Pat. Nos. 3,465,418; 3,501,202; 3,535,002 and 3,564,896 present similar axles wich again include the two bearing mounting areas and a rigid, integrally formed bearing stop for the inner bearing.

While there have heretofore been disclosed a number of axles or axle spindles formed from a generally tubular blank which might tend to save weight and material, there remains some question regarding their applicability for the particular heavy duty use for which the present invention is intended. For example, U.S. Pat. Nos. 1,091,751; 2,133,091 and 2,133,092 all disclose how a tubular blank having a uniform thickness can be generally formed to provide the bearing mounting regions mentioned above for support of a vehicle wheel. However, since none of these axle spindle configurations include a rigid, radially extending bearing stop for the inner bearing, it is doubtful that such axle spindles could be utilized in the heavy duty environment expected for the present invention.

U.S. Pat. No. 3,701,564 appears to disclose that a spindle of the desired type can generally be formed by cold working a tubular blank to include a radially extending bearing stop while still maintaining a generally uniform wall thickness. However, there is some doubt that such a product could be satisfactorily employed. Generally, it has been found that the forces on an integrally formed bearing stop for the inner bearings are so significant that the resulting concentration of stresses at the transition between the bearing mounting region and the bearing stop have required the thickness of the spindle to be significantly enlarged in this area.

In fact, there have even been some axle spindles which have been formed from tubular blanks which initially were provided a non-uniform thickness to insure that additional metal would be retained in the bearing mounting region after the basic reduction in this area was completed.

It can be seen that a number of prior art axle spindles are inappropriate for use on heavy duty vehicles since they utilize an inner bearing with an inner race that has a cylindrical inner surface but fail to provide a rigid bearing stop required for such a bearing. Other configurations appear to be appropriate for such use but require additional material and weight to provide adequate strength for such a bearing stop when it is integrally formed with the rest of the spindle. The use of a non-integral bearing stop which includes a collar that is welded to a frusto-conical portion of the spindle inwardly of the cylindrical inner bearing region does reduce the weight of the axle compared to the above mentioned prior art axles but still requires some transitional areas that could weaken the spindle and the collar itself does add some weight to the basic spindle.

SUMMARY OF THE INVENTION

Therefore, it is an object of this invention to provide reliable, safe and lightweight axles and/or spindles for heavy duty trucks and trailers and a method for providing the same.

It is a further object to provide a spindle of the type described which eliminates the need for a bearing stop adjacent the inner bearing and thereby reduces stress concentrations in the spindle.

To provide these and other objects of the invention, a preferred spindle is for an axle of the type which is capable of supporting a vehicle wheel mounted thereon at a pair of axially disposed bearing assemblies for rotation about the axis of the spindle. The spindle includes a cylindrical end portion having a first diameter for receiving a first of the bearing assemblies. A major portion of the spindle has transverse dimensions larger than the first diameter. A transition portion is between the end portion and the major portion and includes a generally frusto-conical outer surface. The frusto-conical outer surface is capable of receiving a second of the bearing assemblies thereon which includes a frusto-conical inner surface to match the taper of the frusto-conical outer surface. The spindle is preferably formed by the reduction of a hollow tubular blank having a generally uniform external diameter and wall thickness.

DESCRIPTION OF THE INVENTION

Figure 1:
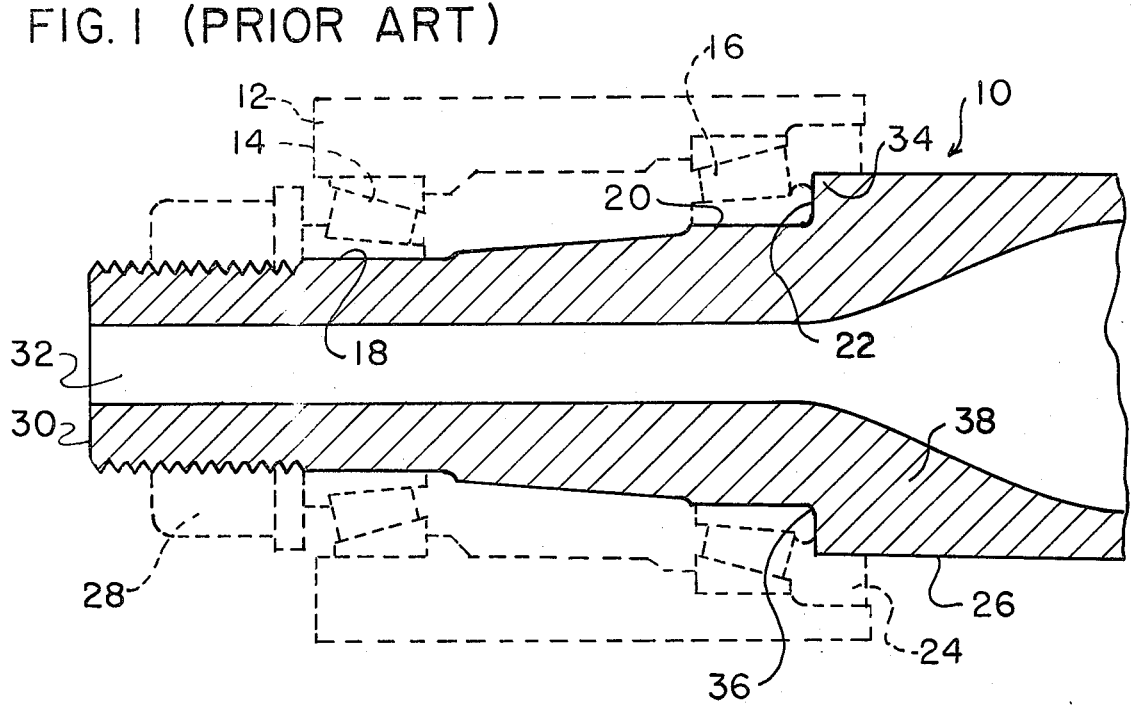
FIG. 1 is a sectional side view of a prior art spindle end of a tubular axle with the bearing assemblies shown in phantom.

As seen in FIG. 1, a prior art axle spindle is adapted to rotatably support a wheel (not shown) mounted on a wheel hub 12 at a pair of axially disposed tapered roller bearing assemblies 14 and 16. The outer tapered roller bearing assembly 14 and the inner tapered roller bearing assembly 16 are respectively received at an axially separated pair of cylindrical bearing regions 18 and 20 of the spindle 10. During installation, the tapered roller bearing assemblies 14 and 16 are installed within the central opening of the wheel hub 12 and the hub 12 is axially positioned on the spindle 10 to locate the inner tapered roller bearing assembly 16 against an integral, radially extending bearing stop 22 of the spindle 10. The inner bearing region 20 has a larger external diameter than the outer bearing region 18 to facilitate assembly. An oil seal 24 is provided at the interior side of the wheel hub 12 to make sliding contact with an exterior surface 26 of the spindle 10 to insure lubrication will be retained at the inner bearing assembly 16 during wheel operation.

A locking nut 16 assembly 28 is installed on the threaded end 30 of the spindle 10 to apply axial force to the wheel hub 12 as the inner tapered roller bearing 16 is forced against the bearing stop 22. A hub cap (not shown) and a suitable means for sealing the central opening 32 of the spindle 10 at the end 30 are provided to protect the locking nut assembly 28 and to establish the wheel lubrication area at the exterior side of the wheel hub 12.

As mentioned hereinabove, there presently exists a number of methods for forming an axle spindle of the type generally shown in FIG. 1. Spindles for trailer or drive axles might be integrally formed or welded to a central beam or axle housing extending to the right of FIG. 1 (not shown). Although the general configuration of spindle 10 is typical of a number of spindles presently in use, the portion of the axle between the spindles might be shaped or designed differently depending on the function of the axle. For example, the beam of a trailer axle might have a circular or rectangular cross section without affecting the dimension of the spindle needed to support the wheel. Although the exterior surface 26 of the spindle at the bearing seal 24 would be cylindrical for proper sealing, the shape required for a proper transitional area to join with the central portion of the axle will not alter the spindle 10, as described above.

Similarly, spindles found on steering axles do not typically extend to the right of the oil seal 24 as shown in FIG. 1. Instead, the spindle is shortened to extend from a steering knuckle which is, in turn, pivotally joined to a steering axle beam. It is well known in the art that different wheel hub mounting means, bearing seals and the addition of various types of brake assemblies would, similarly, not alter the basic prior art spindle configuration requiring two axially separated bearing regions having different diameters and a bearing stop adjacent the inner bearing region for proper receipt and retention of the wheel hub on the spindle.

It is a primary concern in all axle configurations of the type described that the spindle be provided adequate strength for supporting the wheel throughout operation of the heavy duty truck and/or trailer. It has been found that the spindle is subject to significant stress in the bearing stop region. Hot forging or otherwise forming the spindle 10 to provide an integrally formed shoulder 34 to provide the bearing stop 22 requires an abrupt transition in the outer configuration of the spindle at 36 causing a high concentration of stresses in this region. Compounding the problem is the fact that some forming methods alter the crystaline structure of the metal as it is being worked to provide this transition which would further decrease its ability to withstand stress when compared to the strength at other locations along the length of the axle. Consequently, the spindle 10 is typically provided an additional concentration of metal at 38 which increases the strength of the spindle in this region but significantly adds to its overall weight and to the amount of metal required for its formation. There is a continuing need to decrease the overall weight of heavy duty trucks and trailers to reduce fuel requirements and to minimize the raw material expenses which add to the overall manufacturing costs.

It is possible to eliminate some of the undesired features of the prior art spindle 10 by eliminating the integral shoulder 34 which presently provides the bearing stop. It has been found that a basic spindle configuration can be provided which includes a cylindrical region for the outer tapered roller bearing and a cylindrical region for the inner tapered roller bearing. A frusto-conical transition area from the inner tapered roller bearing region to the larger diameter of the basic spindle can be adapted to receive a collar capable of providing the bearing stop. Welding the collar at a location on the frusto-conical outer surface remote from the inner bearing region decreases the stress concentrations and thus allows the basic spindle to be provided with a reduced wall thickness to reduce the overall weight of the spindle configuration. However, it is still essential to provide a transition area between the two bearing regions in addition to the one between the inner tapered roller bearing region and the larger diameter of the basic spindle which would weaken the metal during working and leave some areas subject to stress concentrations during use. Additionally, although eliminating the shoulder 34 reduces the weight of the basic spindle, some weight will be added by the inclusion of the collar which replaces it.

Figure 2:
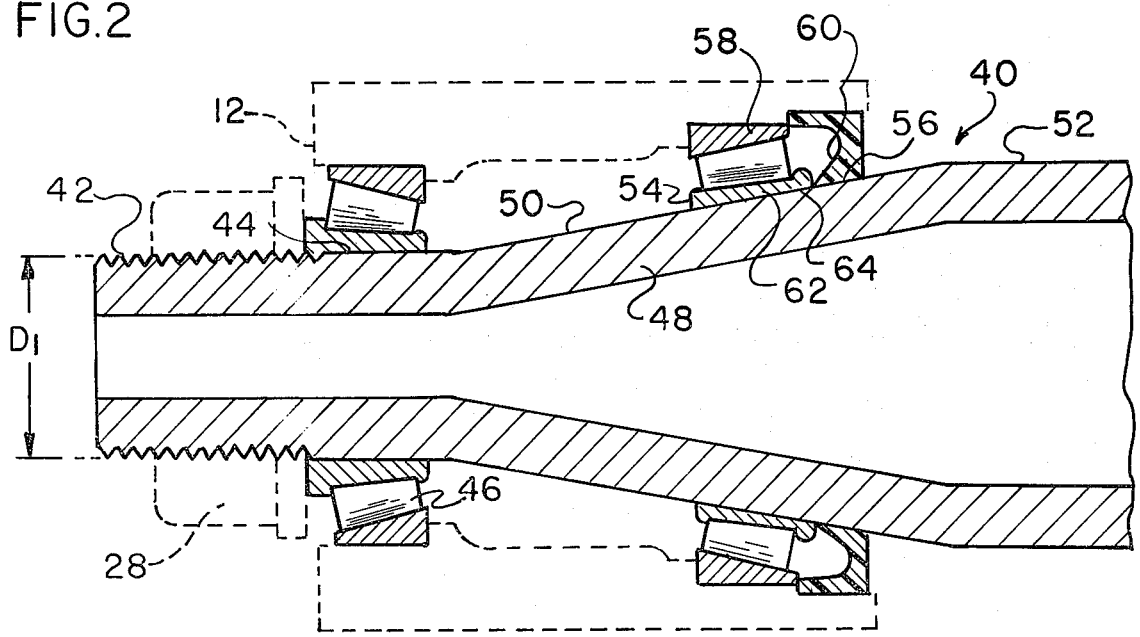
FIG. 2 is a sectional view of the final machined axle spindle of the present invention.

As seen in FIG. 2, the preferred axle spindle 40 even eliminates the remaining undesired features of a design which is a significant improvement over the prior art spindle 10. The spindle 40 includes an overall exterior configuration different from the prior art spindle 10 of FIG. 1 but is capable of supporting a wheel and wheel hub configuration identical to that depicted in FIG. 1. The first end 42 is threaded to receive an identical locking nut assembly 28. The first end 42 also includes a final machined and induction hardened outer tapered roller bearing region 44 having a cylindrical outer surface with a diameter $D_1$ to receive the outer tapered roller bearing assembly 46 thereon which is identical to the tapered roller bearing assembly 14 utilized in the prior art spindle. However, the spindle 40 significantly includes only a single transition area 48 having a generally frusto-conical outer surface 50 between the first end 42 and the basic spindle portion 52.

The frusto-conical outer surface 50 of the finished spindle 40 is machined and hardened to include an inner tapered roller bearing region 54 and an oil sealing surface 56 thereon. Accordingly, an inner tapered roller bearing assembly 58 and an oil seal 60 for the spindle 40 are different from the inner tapered roller bearing assembly and oil seal of the prior art spindle 10 of FIG. 1. However, the outer dimensions of these elements are identical to those of the prior art and, thus, a standard wheel and wheel hub configuration can be utilized.

Although the inner tapered roller bearing 58 is structurally designed to support the same forces which would exist with the use of the prior art bearing 16, the inner race 62 no longer includes a cylindrical inner surface. Instead, the inner race 62 is provided a frusto-conical surface 64 to match the frusto-conical outer surface of the bearing region 54.

The matching frusto-conical surfaces 54 and 64 of the present invention eliminate the need for a a radially extending bearing stop and reduce the transitions along the length of the spindle 40. As a result, the spindle 40 requires less raw material to manufacture and weighs significantly less than the prior art spindles. For the same axle load rating, the spindle 40 could be provided a wall thickness which is less than that which would have been acceptable for a prior art spindle because the transitions and discontinuities along the length of the spindle have been minimized to reduce the likelihood of high stress concentrations.

When the wheel is installed on the spindle 40, the locking nut assembly 28 is again used to force the wheel axially onto the spindle. The force applied to the inner tapered roller bearing assembly 56 is sufficient to prevent the wheel from wobbling but the strength and integrity of tapered roller bearing assembly 56 prevents any additional axial movement beyond the bearing region 54 which would interfere with proper wheel support during heavy duty use.

Although it is the primary purpose of this invention to reduce the weight of the spindle configuration itself, it has been found that altering the prior art inner tapered roller bearing design to eliminate some of the material needed for the inner race adds to the weight reduction of the overall configuration without affecting its strength or reliability. In fact, it is believed that with mass production the inner tapered roller bearing assembly 58 might be provided at a reduced cost because of the reduction of material and the possibility that the inner race 62 might be formed of sheet material rather than being machined as required with the prior art bearing 16.

Similarly, although the oil seal 60 must be adapted to make sealing contact with a frusto-conical surface 56 of the spindle 40, this would not present any problem to those familiar with the oil sealing art. In fact, it is believed that general assembly of the wheel and bearing at this inner region might be improved with the elimination of a cylindrical surface on the spindle. However, it is recognized that the basic configuration of the spindle 40 might be slightly altered or the basic design of the seal 60 might be altered to provide a cylindrical sealing surface if desired.

As explained hereinabove, it can now be seen that the preferred axle spindle 40 is capable of supporting existing wheel and wheel hub configurations but is significantly lighter while retaining the desired strength characteristics needed for heavy duty trucks and trailers. The inclusion of an inner bearing assembly 58 with a tapered inner race 62 eliminates the need for a bearing stop which was required when the inner bearing included a cylindrical inner race. Additionally, the gradual reduction in diameter from the center to the end of the spindle without extreme transitions or discontinuities eliminates the need for additional metal within the spindle so that relatively uniform thickness can be provided. While the tubular configuration might be provided through a number of forming methods, it is preferable to begin the formation from a tubular blank of steel or other suitable metal. Consequently, for trailer axles, for example, it would now be possible to provide a single tubular blank that can be initially shaped in the center to form the beam portion with any desired cross section. Additional formation of the ends of the blank would provide the spindle regions. Although hot swagging methods could be employed, the preferred method includes cold forming which would reduce the energy required to form and axle and, thus, further reduce the overall cost of manufacture.

Figure 3:
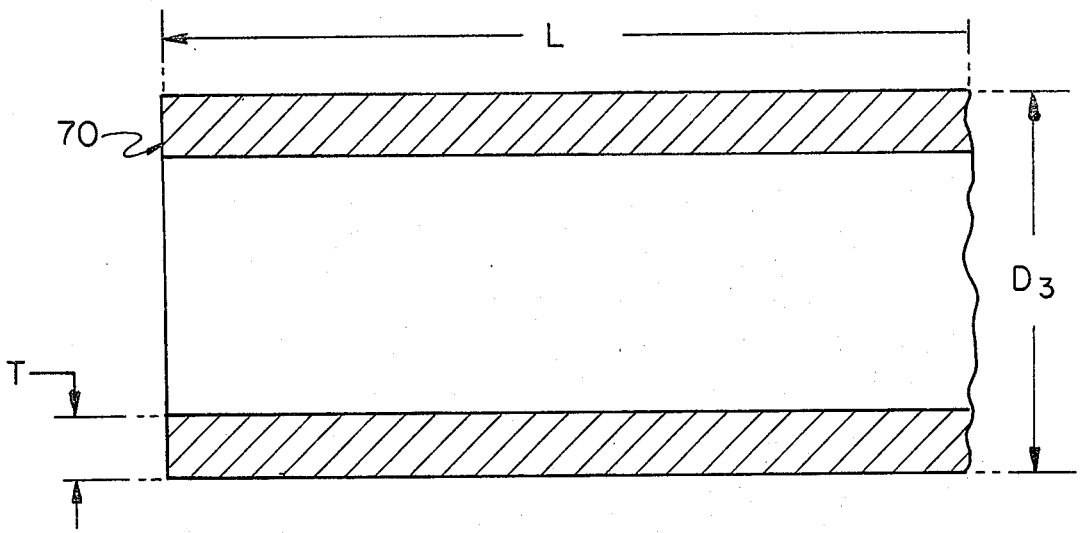
FIG. 3 is a sectional side view of the tubular blank used in the method for forming an axle spindle.

As seen in FIG. 3, a preferred tubular blank 70 is cylindrical in shape with the outside diameter $D_3$ and a uniform thickness T. The length L of the blank 70 would be less than the length of the finished axle as shown in FIG. 2 and can be predetermined by those skilled in the metal working art. The length would depend on the particular metal employed, the diameter and wall thickness of the blank and the exact configuration desired for the spindle region. It is also known that if the above mentioned parameters are identical, the length might still be different depending on whether hot swagging or cold forming is to be employed.

In a typical trailer axle produced by the preferred method of cold forming, the tubular blank would have an outer diameter of 5 inches, a wall thickness of 0.05 inch and a length of approximately 76 inches. The finished axle including spindle 40 would have an overall length of about 81 inches with the outer bearing region having an outer diameter of about 2.6 inches. The slope of the transition area would be about 10 degrees and the inner bearing would have a minimum inner diameter of about 3.3 inches and a maximum inner diameter of about 3.85 inches.

Figure 4:
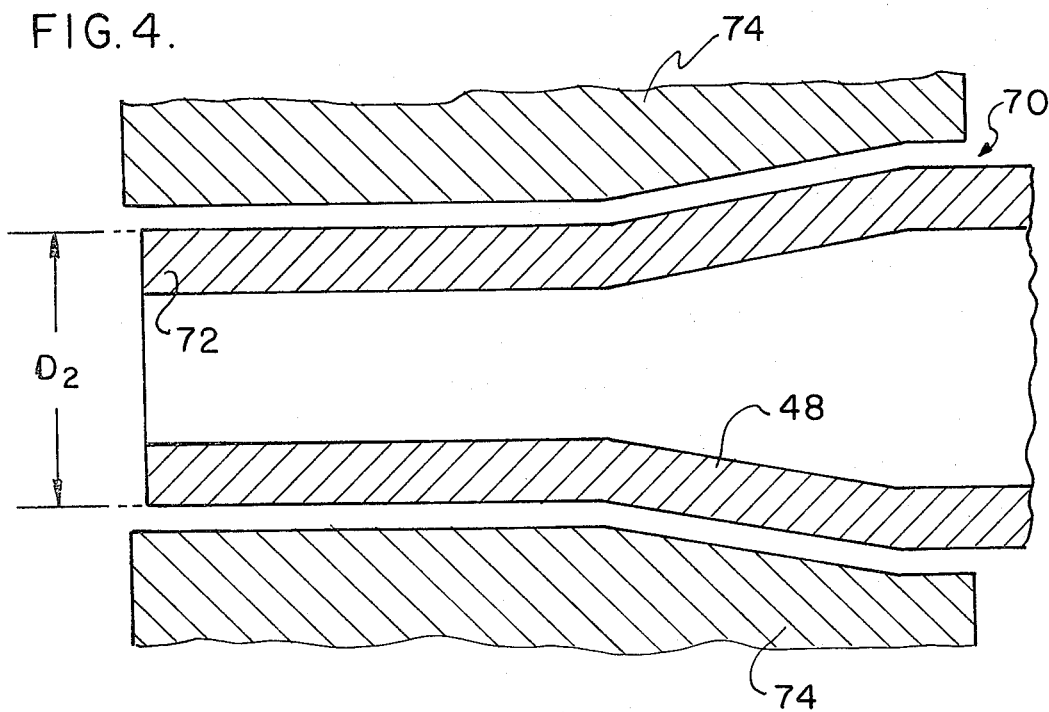
FIG. 4 is a sectional side view of the tubular blank after being reduced by the first forming tool.

As seen in FIG. 4, the first step of cold forming basically reduces the blank 70 to provide a portion of the transition region 48 and to decrease the diameter of the remaining end 72 of the spindle region to an intermediate diameter $D_2$. Cold forming is preferably accomplished by the use of a plurality of radially, inwardly moving dies 74 (only two of which are shown). In one such cold forming machine, twelve dies are circumferentially disposed about the blank 70 with only an 0.08 inch gap therebetween when the dies 74 are all inwardly positioned to form the blank 70. Although the cold forming machine can basically provide the spindle with the shape shown in FIG. 4 with only one inward and outward cycle of the dies 74, it is not uncommon in this type of reducing operation to rotate the work product for a second cycle to provide uniform reduction of the metal including the metal remaining between the gaps during the first cycle. It will be noted that after the first step is completed, the spindle region is elongated from the original length L and the tubular thickness has slightly increased from the original thickness T.

Figure 5:
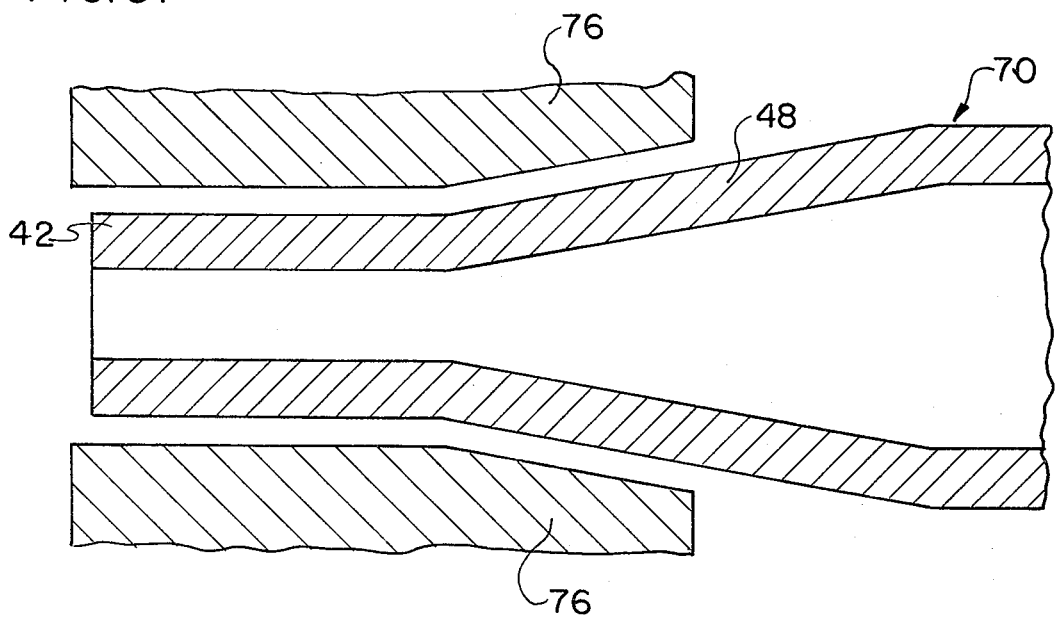
FIG. 5 is a sectional side view of the tubular blank after being reduced by the second forming tool.

As seen in FIG. 5, the second step of cold forming is similar to the first step. A different set of twelve dies 76 further reduces the end of the blank 70 to complete the definition of the transition region 48 and provide the end 42 of the spindle 40.

In circumferential cold forming of the type described, some practical limitations exist regarding the amount of reduction that can be accomplished in a single step. The gaps between the dies at the inward position can result in too great a space between the dies when they are all fully retracted if the required radial deformation is too great. Consequently, two steps are desired for the preferred spindle 40 but it is possible that some spindle configurations might allow a single cold forming step.

Although the preferred axle spindle and method of forming the same has been described hereinabove, it can be seen that one skilled in the art could provide a different spindle or alter the method of formation without departing from the invention as claimed.

I claim:

1. A method of forming an axle spindle and bearing assembly for a vehicle wheel of the type to be utilized in heavy duty truck and trailer applications, said vehicle wheel being subjected to normal operating forces which require a pair of tapered roller bearings for its support and produce primary stresses in said axle spindle at an inwardly position tapered roller bearing of said pair, said method comprising: providing a hollow tubular blank having a central axis, a generally uniform external diameter and wall thickness and a first open end; reducing said tubular blank at a first region including said first end concentric with said central axis to provide a first diameter therefor; forming a transition region with a relatively uniform thickness having a frusto-conical outer surface between said first region and a portion of said tubular blank which is free of said reducing and remote from said first end; machining an area of said first region and an area of said frusto-conical outer surface for respectively receiving first and second tapered roller bearings of said pair thereon for rotatably supporting said wheel on said spindle, said second tapered roller bearing being said inwardly positioned tapered roller bearing of said pair; providing said first tapered roller bearing with an inner race having a cylindrical inner surface matching said area of said first region and providing said second tapered roller bearing with an inner race having a frusto-conical inner surface matching said area of said frusto-conical outer surface to provide the only contact between said second tapered roller bearing and said axle spindle.

2. The method as set forth in claim 1, wherein said steps of reducing at said first region and forming said transition region are accomplished by circumferentially cold working said tubular blank.

3. The method as set forth in claim 2, wherein a first step of cold forming includes forming a portion of said transition region remote from said first end and reducing the said blank at said first region and the remainder of said transition region to provide an interim diameter therefor which is greater than said first diameter and a second step of cold forming to complete the formation of said first region and said remainder of said transition region.

* * * * *